United States Patent [19]

Ansar

[11] 4,150,491
[45] Apr. 24, 1979

[54] INDICATOR OF TRUE WIND DIRECTION FOR SAIL BOATS

[76] Inventor: Lars A. P. Ansar, Asogatan 160, 116 32 Stockholm, Sweden

[21] Appl. No.: 848,673

[22] Filed: Nov. 4, 1977

[30] Foreign Application Priority Data

Nov. 10, 1976 [SE] Sweden .............................. 7612545

[51] Int. Cl.² ............................................. G01C 17/14
[52] U.S. Cl. .................................. 33/349; 33/355 R; 33/364
[58] Field of Search ...................... 33/349, 352, 355 R, 33/356, 364; 116/26, DIG. 43; 73/188

[56] References Cited

U.S. PATENT DOCUMENTS

| | | | |
|---|---|---|---|
| 742,472 | 10/1903 | Moses | 33/352 |
| 1,282,095 | 10/1918 | McArdle | 33/355 R |
| 2,303,990 | 12/1942 | Dietz | 33/349 |
| 2,363,087 | 11/1944 | Salisbury | 73/188 |
| 3,664,292 | 5/1972 | Sherman | 33/355 R |
| 3,824,947 | 7/1974 | Honkaranta et al. | 33/349 |

FOREIGN PATENT DOCUMENTS

| | | | |
|---|---|---|---|
| 2286751 | 4/1976 | France | 33/355 R |
| 5775 of | 1909 | United Kingdom | 33/355 R |

Primary Examiner—Richard R. Stearns
Attorney, Agent, or Firm—Sughrue, Rothwell, Mion, Zinn and Macpeak

[57] ABSTRACT

A compass with means attached thereto for presenting a visual indication of the direction of the true wind. Such compass includes a compass dial divided into a plurality of equal parts, and it can be arranged to suit different viewing angles. To suit different types of boats, sailing conditions, etcetera, the indicating means may be adjustable. The device computes mechanically the direction of the true wind from the knowledge of the boat's course and the angle between such course and the direction of the true wind.

7 Claims, 6 Drawing Figures

TRUE WIND DIRECTION

TRUE WIND DIRECTION

INDICATOR OF TRUE WIND DIRECTION FOR SAIL BOATS

BACKGROUND OF THE INVENTION

1. Field of the Invention

The present invention pertains to compasses for use in sailing boats, and particularly pertains to a compass or tactical instrument having means which indicate the direction of the true wind when sailing close-hauled. A compass showing the direction of the true wind instead of only showing actual course is very useful for the crew of a sailing boat when they want to observe and take advantage of variations in the direction of the true wind.

2. Description of the Prior Art

A prior art compass that has been provided for sail boat crews to show the direction of the true wind has the limitation that it can not be arranged to suit different requirements with respect to viewing angles. This is often very important because the crew must be in a certain place for maximum speed and at the same time be able to observe the compass.

References cited by the Swedish Patent Office:
U.S. Pat. Nos. 2,363,087 and 3,791,211 and DOS 2,233,611.

No one of these citations describes a indicator of true wind direction.

SUMMARY OF THE INVENTION

The present invention provides a new device for sailing boats, which indicates the direction of the true wind when sailing close-hauled, comprising a compass having a compass dial which is divided into a plurality of identical parts, said compass having means indicating true wind direction.

It is also an object of the present invention to provide a device, which shows the direction of the true wind, that can be arranged to suit various requirements with respect to viewing angles that are encountered in different types of boats.

A further object of the present invention is to provide a device which has a dial with single symbols such as digits, thus bigger and easier to read than the figures on existing compasses of similar size.

DESCRIPTION OF THE PREFERRED EMBODIMENT

Figure 1:
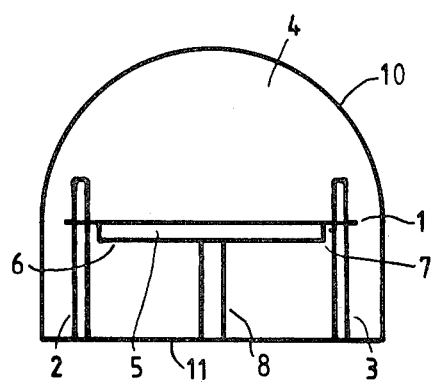
FIG. 1 is an elevation of the preferred embodiment of the present invention.
Figure 2:
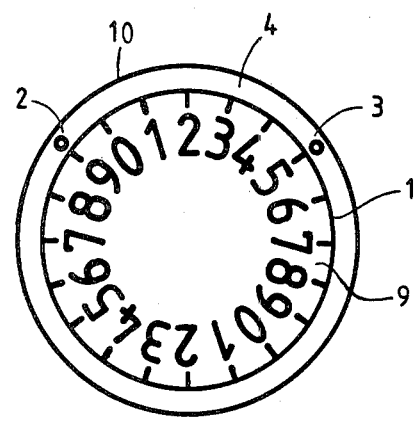
FIG. 2 is a plane view of the preferred embodiment of the present invention.

A compass card 1 and two lubber lines 2, 3 are mounted inside a compass housing 4. The compass card 1 includes a magnetized disc 5 having a magnetic northpole 6 and a magnetic southpole 7. Such compass card 1 is rotatably mounted on a pin 8 in a maner known per se. Such pin 8 is secured in the bottom 11 of the housing 4. The compass card 1 has a dial 9 inscribed in a clockwise order at the outer edge of the compass card 1. Such dial 9 is divided in two identical parts, each such part reads 0 1 2 3 4 5 6 7 8 9 0. The housing 4 comprises a transparent dome-shaped top 10 together with a circular bottom 11. Such top 10 and bottom 11 are glued or otherwise secured to each other to provide a closed housing 4. Such housing 4 is filled with a suitable fluid so as to stabilize the movements of the compass card 1. The two lubber lines 2, 3 are secured to the bottom 11 of the housing 4. Such lubber lines 2, 3 are perpendicular to the bottom 11 and are located so they pass near to the outer edge of the compass card 1. The angular distance between the two lubber lines 2, 3 is six units of the compass card dial 9.

In using a device according to the preferred embodiment of the present invention, the device is mounted in sailing boat 12. The device is located before the person viewing it and is orientated so the lubber lines 2, 3 are forward of the compass card 1 and symmetrically positioned with respect to the boats fore-and-aft axis. The person observing the present device shall always read against that lubber line of the two which is at the moment on the leeward side of the boat. This comes naturally for example in a dinghy, where the crew is usually situated on the winward side.

Figure 3:
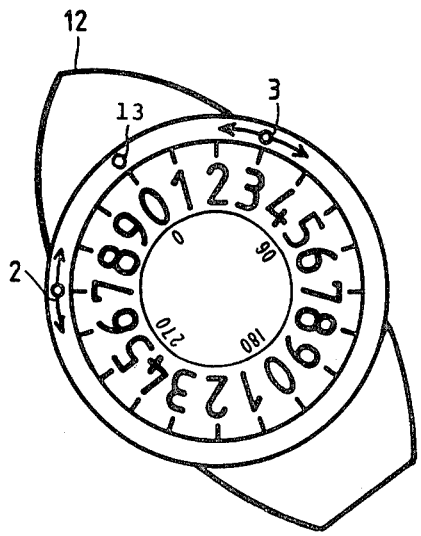
FIG. 3 is a schematic plane view of the preferred embodiment of the present invention mounted in a sailing boat on starboard tack.

Consider now the sailing boat 12 sailing close-hauled on starboard tack, FIG. 3. The angle between the fore-and-aft axis of the boat and the direction of the true wind is 2 units of the compass card dial 9. The person viewing the device will read the value 7 against the lubber line 2, at the moment on the leeward side of the boat. Thereafter consider the boat tacking to port. The boat, and therefore also the compass housing 4 with its lubber lines 2,3 will turn 2+2=4 units clockwise around the compass card dial 9. The person observing the device will change his focus from the prior leeward lubber line 2 to the new leeward lubber line 3, i.e. six units clockwise along the compass card dial 9. Altogether this means that the observing person will move his focus 4+6=10 units clockwise along the compass card dial 9 when the boat is tacking. Since the dial 9 has a periodicity of 10 units this means that the device shows the same value on opposite tacks, i.e. it shows the direction of the true wind.

Figure 4:
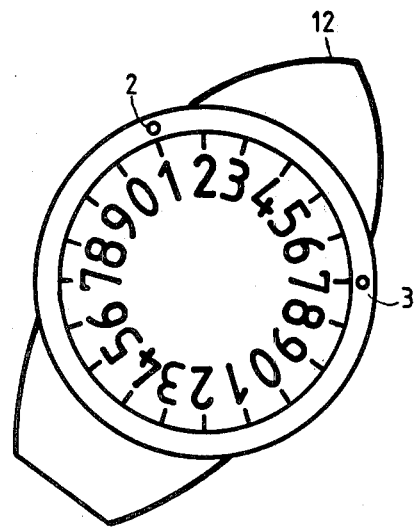
FIG. 4 is a schematic plane view of the preferred embodiment of the present invention mounted in a sailing boat on port tack.

FIG. 4 shows the sailing boat on port tack. The person observing the device will read the value 7 against the leeward lubber line 3.

In using the device as a tactical device, e.g. when sailing close-hauled against a wind whose direction is oscillating around a mean value, the crew observes the device and estimates the mean value of the true wind direction. Then it is very simple to select the favoured tack, i.e. the tack that is at the moment closest to the mean wind direction: If the indicated number is greater than the mean value, starboard tack is favoured. If on the other hand the indicated number is smaller than the mean value, port tack is favoured.

Devices according to the present invention will not give an unambigous reading representing the direction of the true wind. However, this is insignificant as the device is used as a tactical instrument on sailing boats sailing close-hauled, because the readings will always lie within a sector of about 90 degrees.

In another form of the present invention, suited also for viewing directly from abaft the device, the dial of the compass card is divided in three identical parts. The periodicity of this dial is 0, 120, 240, 360......degrees. If the periodicity 120 degrees is used for a sailing boat which is sailing close-hauled with an angle of 75 degrees between the tacks, the two lubber lines shall be placed with an angle of 45 degrees between them, to ensure the same reading on opposite tacks, 75+45=120 degrees. This angle of 45 degrees between the lubber lines is smaller than the corresponding angle in the preferred embodiment, making the lubber lines better visible when viewing the device from abaft.

Figure 5:
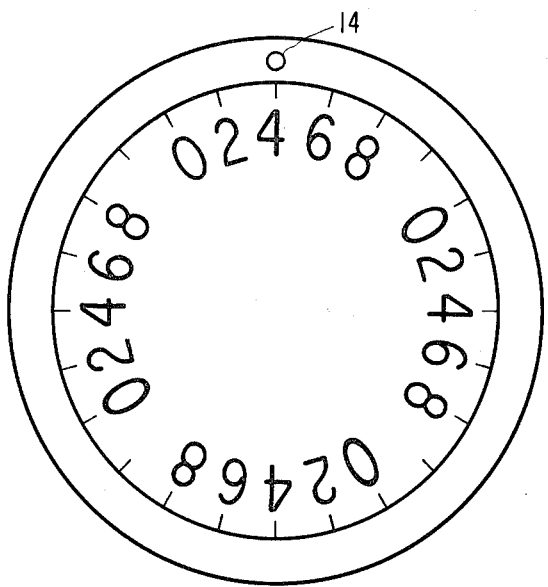
FIG. 5 is a schematic plane view of an alternate embodiment.

If the compass card dial is divided in four equal parts only one lubber line is required if the device is used on a sailing boat which sails with an angle of 90 degrees between the opposite tacks. Further, this form will indicate the course on the reaching legs on a properly laid 45/90 Olympic course: The reaching course is right when the device shows the same value as when sailing close-hauled. Such an embodiment is shown in FIG. 5, and employs a single lubber line 14.

Figure 6:
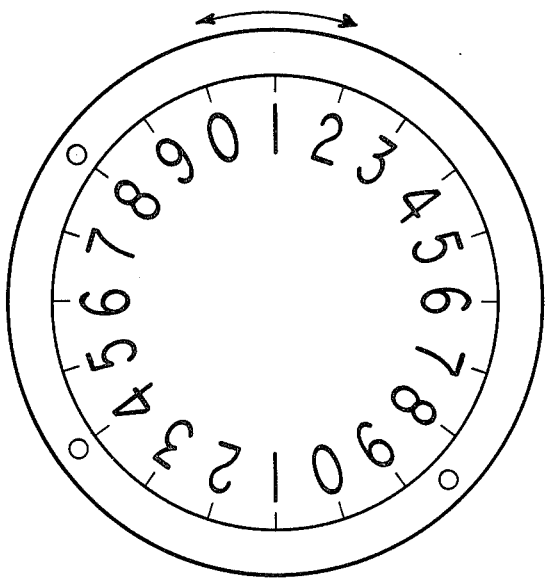
FIG. 6 is a schematic plane view of a further alternate embodiment.

It is to be understood that the fixed lubber lines may be replaced by adjustable lubber lines, as schematically shown by the arrows in FIG. 3, whereby the device can be adjusted to suit different angles between the opposite tacks, or that each fixed lubber line may be replaced by e.g. two fixed lubber lines corresponding to two different angles between opposite tacks. Still another way to make the device adjustable for different angles between the opposite tacks is to mount e.g. two or more lubber lines, with different angles between adjacent lubber lines, as shown in FIG. 6. The relevant pair is brought into view by turning the compass housing around a vertical axis.

It is further understood that the indicator of true wind direction according to the present invention may also comprise a conventional compass card dial with a course lubber line 13 mounted on the fore and aft axis of the boat, as shown in FIG. 3, whereby the device will also function as a compass. Naturally the compass card dial according to the invention may also be inscribed as an annular skirt dial.

The foregoing disclosure and description of the invention are illustrative and explanatory thereof, and various changes and modifications in shape, size, and materials as well as in details of the illustrated construction may be made without departing from the spirit of the invention. Thus, different types of compasses, e.g. gyro compasses, compasses with stationary dial and moving pointer, different locations of the lubber lines to suit requirements, gimbals for the card pivot and lubber lines, as is well understood in the art of compass construction, etc., may be used.

What is claimed is:

1. An indicator of true wind direction for sail boats, comprising: a compass having a dial, means rotatably supporting the dial, and indicating means stationarily mounted adjacent the periphery of the dial to facilitate the reading of symbols thereon, said compass dial having a plurality of circumferentially arranged consecutive equal parts, each part bearing identical symbols arranged in the same order, and in the same circumferential direction.

2. Indicator of true wind direction as set forth in claim 1, wherein said compass includes two indicating means, one adapted to be used on a starboard tack and the other adapted to be used on a port tack, the angular distance between the two indicating means being determined as a function of the number of parts on the compass dial such that they are disposed adjacent substantially the same symbols on their respective tacks.

3. Indicator of true wind direction as set forth in claim 2, wherein the angular distance between said two indicating means is adjustable.

4. Indicator of true wind direction as set forth in claim 1, wherein said consecutive parts of said compass dial are inscribed with symbols wherein each symbol is formed of a single character.

5. Indicator of true wind direction as set forth in claim 1, wherein said compass dial also has a zero to 360° scale inscribed thereon and a stationary indicating means for reading the actual course.

6. Indicator of true wind direction as set forth in claim 1, wherein said compass includes at least three indicating means, the angular distance between adjacent indicating means being different.

7. Indicator of true wind direction as set forth in claim 1 wherein said compass dial is divided into four equal parts, and there is a single indicating means.

* * * * *